United States Patent [19]
Nakane et al.

[11] Patent Number: 5,667,862
[45] Date of Patent: Sep. 16, 1997

[54] MAGNETO-OPTICAL DISK

[75] Inventors: Yasuaki Nakane, Tokyo; Shuichi Igarashi, Kanagawa; Sakuya Tamada, Tokyo; Susumu Sakamoto, Chiba; Teruo Chiba, Miyagi, all of Japan

[73] Assignee: Sony Corporation, Tokyo, Japan

[21] Appl. No.: 686,287

[22] Filed: Apr. 16, 1991

Related U.S. Application Data

[63] Continuation of Ser. No. 345,234, May 1, 1989, abandoned.

[30] Foreign Application Priority Data

Mar. 15, 1989 [JP] Japan ................. 1-008286

[51] Int. Cl.$^6$ ........................... G11B 5/66
[52] U.S. Cl. ............ 428/64.3; 428/64.6; 428/64.7; 428/64.9; 428/336; 428/694 ML; 428/694 DE; 428/694 RE; 428/694 NF; 428/694 KL; 428/694 AM; 428/698; 428/704; 428/900; 360/131; 365/122; 369/13; 369/288
[58] Field of Search ........................ 428/694, 900, 428/213, 64.3, 64.6, 64.7, 64.9, 336, 694 ML, 694 DE, 694 RE, 694 NF, 694 RL, 694 AM, 698, 704

[56] References Cited

U.S. PATENT DOCUMENTS

| | | | |
|---|---|---|---|
| 3,472,575 | 10/1969 | Hunt | 365/122 |
| 4,466,035 | 8/1984 | Connell et al. | 360/114 |
| 4,610,912 | 9/1986 | Takahashi et al. | 428/213 |
| 4,675,767 | 6/1987 | Osato et al. | 360/131 |
| 4,737,408 | 4/1988 | Kuwahara et al. | 428/335 |
| 4,923,765 | 5/1990 | Takayama et al. | 428/694 ML |

FOREIGN PATENT DOCUMENTS

| | | | |
|---|---|---|---|
| 0161807 | 11/1985 | European Pat. Off. | |
| 161807 | 11/1985 | European Pat. Off. | |
| 0 293 797 | 5/1988 | European Pat. Off. | G11B 11/10 |
| 2 485 241 | 12/1981 | France | G11C 13/06 |
| 73746 | 5/1983 | Japan. | |
| 139149 | 6/1987 | Japan. | |
| 139155 | 6/1987 | Japan. | |
| 142550 | 6/1988 | Japan. | |
| 064150 | 3/1989 | Japan. | |

OTHER PUBLICATIONS

Gueugnon, C. et al. "Computation of optical properties of multilayered media for magnetooptical memories." J. Appl. Phys., vol. 57 (Apr. 15, 1985) pp. 3891–3893.

Mansuripur, M. et al., "Optimum Disk Structures and Energetics of Domain Formation in magnetooptical recording." IEEE Transactions on Magnetics, vol. 18 (Nov. 6, 1982) pp. 1241–1243.

(List continued on next page.)

*Primary Examiner*—Leszek Kiliman
*Attorney, Agent, or Firm*—Hill, Steadman & Simpson

[57] ABSTRACT

A magneto-optical disk having a four-layer structure formed of a first protective dielectric layer, a recording magnetic layer, a second protective dielectric layer and a reflective metal layer is disclosed. The constraints for the film thicknesses of the various layers are determined not only from the optical and magneto-optical aspects, but from the aspect of the dynamic thermal response.

The recording magnetic layer is a magnetic layer mainly formed of TbFeCo and having a film thickness of not less than 180 Å and not more than 280 Å. The first protective dielectric layer is a nitride film having a film thickness such that the product of its refractive index and the film thickness is not less than 0.2 and not more than 0.35 times the wavelength of the laser light employed. The second protective dielectric layer is a nitride film having a film thickness such that the product of its refractive index and the film thickness is not less than 0.1 and not more than 0.15 times the wavelength of the laser light employed. The reflective metal layer is a metal layer having a film thickness of not less than 500 Å and not more than 1000 Å, with the metal being electro-chemically less noble than the material of the recording magnetic layer and having a reflectivity at the boundary with the second protective dielectric material of not less than 70%.

8 Claims, 5 Drawing Sheets

OTHER PUBLICATIONS

Mansuriper, M. et al., "Erasable Optical Disks for Data Storage:Principles and Applications", Ind. Eng. Chem. Prod. Res. Dev. 1985, 24, pp. 80–84.

Chen, T. et al. "Thickness Dependence of Magneto–Optic Effects in Tb–Fe Film". Optical Data Storage Conference at Incline Village, Nev., Jan. 17–20, 1983.

Proceedings of the SPIE, vol. 420, 1983; "Magneto–Optic Recording", by M. Mansuripur et al., pp. 222–230.

MAGNETO-OPTICAL DISK

This is a continuation of application Ser. No. 345,234, filed May 1, 1989, now abandoned.

BACKGROUND OF THE INVENTION

1. Field of the Invention

This invention relates to a magneto-optical disk employed in an external memory of an electronic computer or a recording apparatus for recording audio or video information. More particularly, it relates to a magneto-optical disk capable of performing repeated recording and erasure, and which makes use of an amorphous alloy of rare earth-transition metals having an easy axis of magnetization in a direction perpendicular to the film surface as the recording layer.

2. Prior Art

The basic operating principle of a magneto-optical disk is that a portion of a magnetic thin film is heated to a temperature above the Curie point or a temperature compensation point to annul the coercive force of this portion, and that the direction of magnetization of this portion is inverted and assimilated with the direction of the recording magnetic field applied from outside. Therefore, in order that the magnetic domains in which the direction of magnetization has been inverted by recording will be produced with a high density and to the desired shape, it is necessary that the shape of the portion irradiated by the recording laser light be reproduced faithfully as the shape of the inverted magnetic domain. To this end, it is first requirement that the magnetic recording layer be a homogeneous amorphous thin film free of crystal boundaries.

On the other hand, in the magneto-optical disk, the magneto-optical effects, such as the magnetic Kerr effect or the Faraday effect, are utilized in reading out the magnetic domain in which the direction of magnetization has been inverted by recording. Therefore, in producing satisfactory reproducing signals, it is necessary as second requirement that the magnetization be made in the direction normal to the direction of the electro-magnetic field of the electro-magnetic waves of the reproducing laser light, that is in the direction of incidence of the laser light, and that the magnetic recording layer be a perpendicular magnetization film having its easy axis of magnetization normal to the film surface.

Heretofore a thin film of an alloy of rare earth-transition metals has been proposed as the magneto-optical recording film satisfying these requirements. The amorphous perpendicular magnetization thin film of these rare earth-transition metal alloys can be formed easily on an inexpensive base plate or substrate by vacuum film forming methods, such as the sputtering or vacuum deposition methods. Of these alloys, TbFeCo and GdTbFe are practically useful because of their larger Kerr rotation angle.

However, the rare earth-transition metal alloys are inconvenient in that they are highly susceptible to oxidation and hence to corrosion thus affecting their magnetic properties. Our experiments have revealed that, when simply exposed to atmosphere after film formation in vacuum, the TbFeCo film is oxidized to a thickness of about 50 Å from its surface, so that the magnetic properties of the oxidized portion are lost. Therefore, in using the aforementioned thin films of the rare earth-transition metal alloys as the recording magnetic layer, it becomes necessary as a third requirement that the film be sandwiched on its both sides by transparent and thermally and chemically stable protective films impermeable to oxygen.

Under such a situation, there is known a magneto-optical disk wherein, as disclosed for example in the U.S. Pat. No. 4,610,912, a protective film, a magnetic recording film, and a second protective film are provided in this order on a transparent base plate; and a reflective metal film is provided as a fourth layer. This reflective metal film is provided for increasing the apparent Kerr rotation angle in conjunction with the aforementioned two protective films.

It will be noted that, in the magneto-optical disk, since the recording is achieved thermally, various recording properties are governed not only by the magnetic and optical properties, but also by thermal response characteristics. For example, the resolution capability of the recording is governed by the thermal resolution capability of the temperature increasing profile.

On the other hand, the recording/erasure properties also depend on the temperature environment at the time of the application. It is because the temperature of the recording portion is the sum of the increase in the temperature caused by the recording laser light and the temperature at which the portion is preserved. Thus the recording laser light quantity necessary for the temperature to reach the Curie point becomes larger or smaller as the preservation temperature is higher or lower. In order for the magneto-optical disk to be utilized in, for example, a computer memory, it is necessary to take account of the increase in temperature within the disk apparatus,.and the disk is required to have satisfactory characteristics under the environment of a broader temperature range of $-10°$ C. to $60°$ C.

In addition, the recording/erasure/reproducing laser light quantity in the actual disk apparatus is subject to fluctuations caused by the errors in design values or lens contamination. It is thought to be necessary to take account of the fluctuations in excess of the range of $-20\%$ to $+10\%$. The intensity of the magnetic field applied from the outside is also subject to fluctuations. The magneto-optical disk is requrired to be interchangeable among the disk apparatus subject to these fluctuations.

For procuring the interchangeability under the above described situations, it is necessary that the magnetic domain in which the direction of magnetization has been inverted by recording under the combination of the highest values of magnetic field, laser output, and the temperature, be able to be erased under the combination of the lowest values of magnetic field, laser output, and temperature. That is, it is necessary that the magneto-optical disk recorded under elevated temperatures and with the aid of the apparatus of the maximum light quantity and magnetic field be able to be erased by the apparatus under the lower temperatures and with the aid of the apparatus of the minimum light quantity and magnetic field. Also, when the high sensitivity disk produced with the manufacture fluctuations is erased with the combination of the highest values of the magnetic field, laser output, and temperature, the information of the adjacent tracks should not be erased by excess erasure. In addition, the reproduced information should not be lowered in quality when the same track is reproduced continuously in this state for an extended period of time.

Therefore it is necessary, as the fourth and most crucial requirement, that the magneto-optical disk have a broad area of satisfactory recordability in which the extent of the preestimated fluctuations of conditions should be sufficiently allowable.

The numerous proposals that have been made in connection with the magneto-optical disk are directed to possible advantages from the static optical and magneto-optical aspects, but not to constraints from the aspects of dynamic thermal response. Thus these proposals do not meet all of the above cited requirements and are rather poor in practical uses.

Although the four-layer magneto-optical disk has been proposed, as disclosed in the aforementioned U.S. Pat. No. 4,610,912, it has not been investigated what film thicknesses of the four films should be set for meeting the above four requirements.

OBJECT AND SUMMARY OF THE INVENTION

It is therefore a principal object of the present invention to provide a magneto-optical disk which has satisfactory practical uses and a higher recording density while being endowed with a long service life and a broader optimum recording region which sufficiently allows for fluctuations of the conditions under the broader environmental conditions.

According to the present invention, there is provided a magneto-optical disk comprising a first protective dielectric layer formed of a nitride, an amorphous recording magnetic layer having magnetic anisotropy perpendicular to the layer surface, a second protective dielectric layer formed of a nitride, and a reflective metal layer formed of a metal electro-chemically less noble than the recording magnetic layer, the recording magnetic layer being a magnetic layer mainly containing TbFeCo and having a film thickness of not less than 180 Å and not more than 280 Å, the first protective dielectric layer having the product of the refractive index and the film thickness thereof of not less than 0.2 and not more than 0.35 times the wavelength of the employed laser light, the second protective dielectric layer having the product of the refractive index and the film thickness thereof of not less than 0.1 and not more than 0.15 times the wavelength of the employed laser light, the reflective metal layer having a film thickness of not less than 500 Å and not more than 1000 Å, and the reflectivity at the boundary with the second protective dielectric layer being not less than 70%.

The characteristics of the magneto-optical disk are not determined solely by the material and the construction thereof, but depend largely on the combination of the thicknesses of the various layers. According to the present invention, the disk has a four-layer structure comprised of a first protective dielectric layer, a recording magnetic layer, a second protective dielectric layer and a reflective metal layer. The constraints for the film thicknesses of the various layers are determined not only from the optical and magneto-optical aspects, but from the aspect of the dynamic thermal response.

By thus determining the constraints for the film thicknesses of the first protective dielectric layer, recording magnetic layer, second protective dielectric layer and the reflective metal layer not only from the optical and magneto-optical aspects, but also from the aspect of dynamic thermal response, it becomes possible to provide a magneto-optical disk capable of high density recording and having a high resolution capability and a broader optimum recording region which allows for a sufficient extent of fluctuations of the preestimated conditions.

In addition, according to the present invention, there may be provided a magneto-optical disk having high corrosion resistance, operational reliability and practical utilities.

DETAILED DESCRIPTION OF THE INVENTION

The present invention has clarified the constraints for obtaining not only the optimum optical conditions in a magneto-optical disk but also the layered structure for satisfying the optimum thermal conditions. Thus the present invention provides a magneto-optical disk obtained by sequentially stacking a first protective dielectric layer, an amorphous recording magnetic layer having perpendicular anisotropy, a second protective dielectric layer and a reflective metal layer on a transparent base plate, wherein (a) the recording magnetic layer is a magnetic layer mainly comprised of TbFeCo and having a film thickness of not less than 180 Å and not more than 280 Å, (b) the first protective dielectric layer is a nitride film having a film thickness such that the product of its refractive index and the film thickness is not less than 0.2 and not more than 0.35 times the wavelength of the laser light employed, (c) the second protective dielectric layer is a nitride film having a film thickness such that the product of its refractive index and the film thickness is not less than 0.1 and not more than 0.15 times the wavelength of the laser light employed, and (d) the reflective metal layer is a metal layer having a film thickness of not less than 500 Å and not more than 1000 Å, with the metal being electro-chemically less noble than the material of the recording magnetic layer and having a reflectivity at the boundary with the second protective dielectric material of not less than 70%, whereby all of the first to fourth requirements are satisfied.

The magneto-optical disk discussed throughout the specification employs laser light which is a same wavelength for recording or reproducing.

Although various oxides and nitrides have been proposed as the protective dielectric layer, nitrides such as silicon nitride or aluminum nitride are preferred since they are free from oxygen and hence do not produce oxygen contamination during the film forming process, while they exhibit high defensive properties for oxygen and water molecules.

Small amounts of additives such as Cr, Ni or Ti, may be effectively added to the recording magnetic layer for preventing the occurrence of corrosion due to defects present in the protective dielectric layer, such as minute pinholes.

For preventing the above described oxidation, it is preferred that the protective dielectric layer and the recording magnetic layer be formed continuously by vacuum film forming without exposure to atmosphere.

Figure 1:
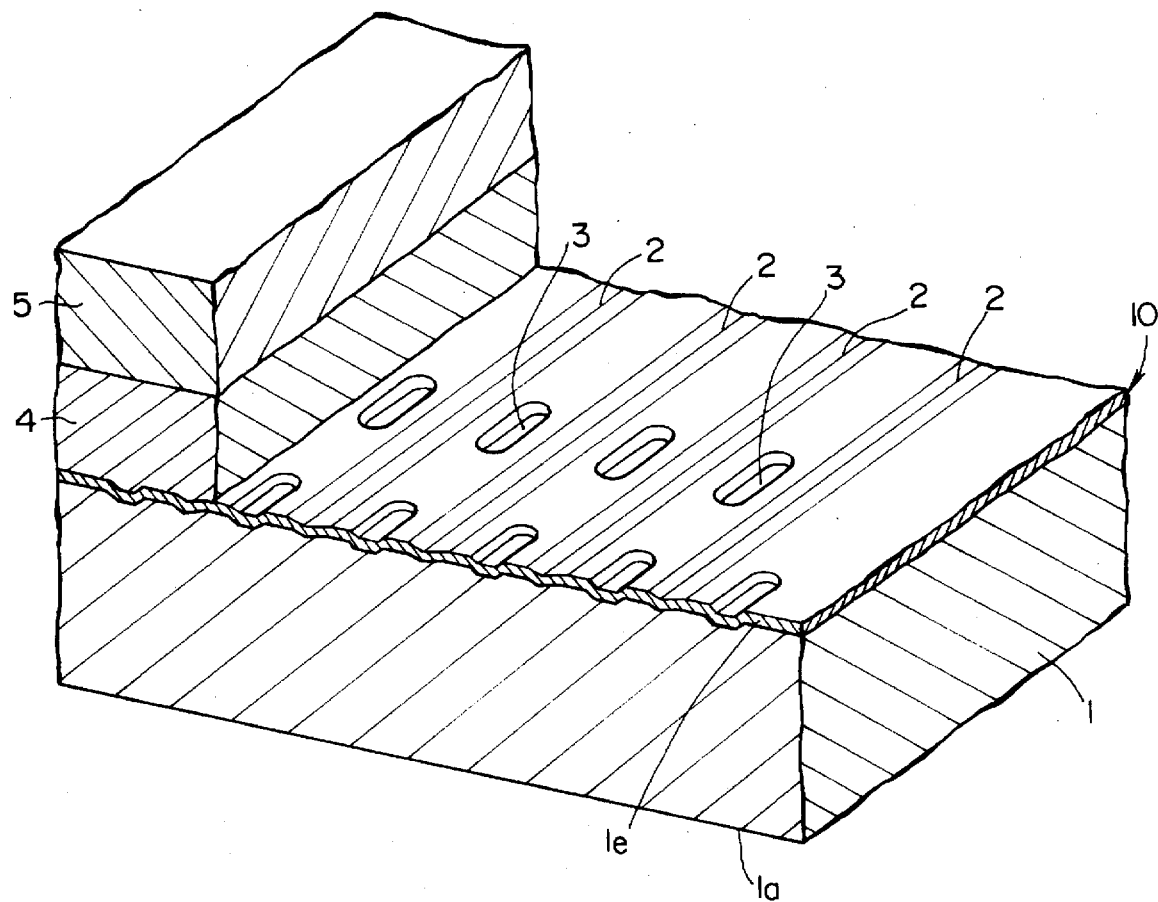
FIG. 1 is an enlarged diagrammatic sectional view showing essential portions of an embodiment of the magneto-optical disk to which the present invention is applied, with a portion thereof being broken away.

FIG. 1 is a partial side view showing an embodiment of a magneto-optical disk to which the present invention is applied. This magneto-optical disk is comprised of a transparent base plate 1 on which are stacked a recording layer 10 and an organic protective layer 4. If necessary, another base plate having a similar structure may be stacked on the base plate 1 to provide a double-sided disk.

The transparent base plate 1 is a transparent disk-shaped base plate about 1.2 mm in thickness. As the materials for the base plate, plastic materials such as acrylic resin, polycarbonate resin, polyolefin resin or epoxy resin or glass plate is preferred.

The transparent base plate 1 is required to have a laser light incident side surface 1a which is optically sufficiently smooth and a recording layer side surface 1b which is usually provided with guide grooves 2 and address codes 3 each having a depth about one fourth the wavelength of the laser light employed.

Figure 2:
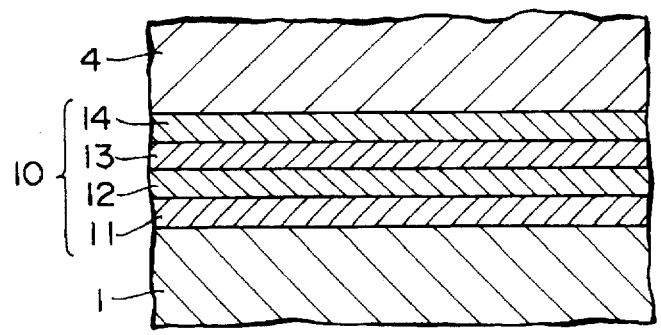
FIG. 2 is an enlarged sectional view showing essential portions of a recording layer.

On the recording layer side surface 1b of the transparent base plate 1, there are sequentially stacked by a vacuum film forming technique, a first protective dielectric layer 11, a recording magnetic layer 12, a second protective dielectric layer 13 and a reflective metal layer 14 as shown in FIG. 2. Of these, the first protective dielectric layer 11 and the second protective dielectric layer 13 are preferably formed of a material that is impermeable to oxygen and water molecules, and free of oxygen and transparent to the laser light employed, such as silicon nitride or aluminum nitride.

The recording magnetic layer 12 is preferably formed of an amorphous magnetic material having an easy axis of magnetization in the direction normal to the film surface, a higher coercive force at room temperature, and a Curie point at about 200° C. The alloy TbFeCo meets this requirement and hence is preferred. Small amounts of a fourth elements such as Cr, may be added for affording corrosion resistance.

The reflective metal layer 14 stacked on the second protective dielectric layer 13 is preferably formed of a heat conductive, highly reflective non-magnetic metal capable of reflecting not less than 70% of the laser light at the boundary of the metal layer 14. Aluminum is preferred as this metal.

The organic protective film 4, provided on this reflective metal layer 14, is preferably formed of a light curable resin having high water-proofness in view of high production efficiency.

The convergent laser light is irradiated so as to pass through the base plate 1 to form a focal point on the recording layer 10 of the four stacked films. When the recording magnetic layer 12 has a thickness less than the wavelength, the laser light is permeated through this layer 12. Therefore, the effective optical and magneto-optical properties of the recording layer 10 depend not only on the optical properties of each layer, but depend largely on the combination of the thicknesses of the respective layers, since the light reflected at the boundaries between the layers undergoes multiple interference with the light passing through the boundaries.

The irradiated laser light is not absorbed by the transparent protective dielectric layers 11, 13, but is absorbed by the recording magnetic layer 12 and the reflective metal layer 14 and thereby converted into heat, the remaining light being returned as the reflected light. The energy absorbed at this time by the reflective metal layer 14 having superior heat conductivity is not effective for recording and, when the energy is larger, the heat is dissipated along the film surface to lower the resolution capability. Therefore, an arrangement is preferred in which this may be reduced to a negligible value. These conditions are met by the second protective dielectric layer 13 having a thickness ranging from 200 Å to 800 Å.

The constraints to the respective layers necessary for achieving the above object will be hereinafter explained for the case of the above described four-layered magneto-optical disk.

Constraints to the Recording Magnetic Layer

Magnetic response is extremely faster than thermal response. It is therefore critical to raise the temperature quickly and to lower the temperature similarly quickly to reduce the adverse effect when recording is performed at the next time adjacent to the preceding recording. For meeting this condition, it is important that the recording magnetic layer 12, which is both the sole heating and recording layer, has a low thermal capacity, that is, the recording magnetic layer 12 has a reduced film thickness. This is because the thermal conduction along the film surface is increased, if the film has a larger thickness, and hence the cooling is retarded. However, with a smaller film thickness, the film exhibits unstable magnetism and hence the properties of the film are not exhibited.

Figure 3:
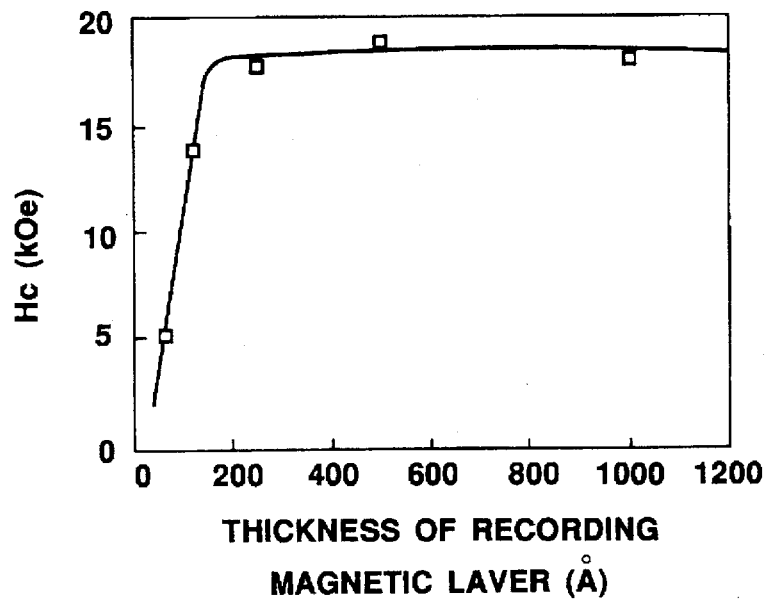
FIG. 3 is a diagram showing the relation between the film thickness of the recording magnetic layer and the coercive force Hc.

FIG. 3 shows the results of measurement of the coercive force $H_c$ of a sample having its TbFeCo layer changed in thickness. This sample is produced by continuously forming silicon nitride, TbFeCo and silicon nitride layers under the same conditions on the glass base plate by sputtering. As shown in FIG. 3, the coercive force $H_c$ is lowered acutely at the film thickness not larger than 180 Å.

It is therefore a requisite that the film thickness of the recording magnetic layer 12 be not less than 180 Å. The upper limit of the film thickness is set as the upper limit of the range for which a sufficient extent of the optimum recording region is obtained. The optimum recording region with the recording laser light quantity changed represents a crucial parameter and a value that may be used as an index for this parameter is found from an equation of 2×(Pmax−Pmin)/(Pmax+Pmin), wherein Pmin stands for the lower limit light quantity for the optimum region and Pmax stands for its upper limit value. This parameter is referred to hereinafter as the energy window. This energy window expresses the optimum recording region in terms of the relative ratio of the center value of this region.

The present inventors have conducted an optical analysis and a three-dimensional thermal analysis of the structure of the embodiment shown in FIG. 1 with the aid of a computer. In these analyses, the shape of each magnetic domain in which the direction of magnetization is inverted by recording was found as the region in which the temperature exceeded the Curie point. The wavelength of the reproducing signals was found by a theory of diffraction for the numerical aperture of the objective lens of 0.5 and the wavelength of the laser light of 780 nm. A disk having the same structure as that used for several analytic operations was produced for trial for improving the precision in computation by collation with the computed results.

Figure 4:
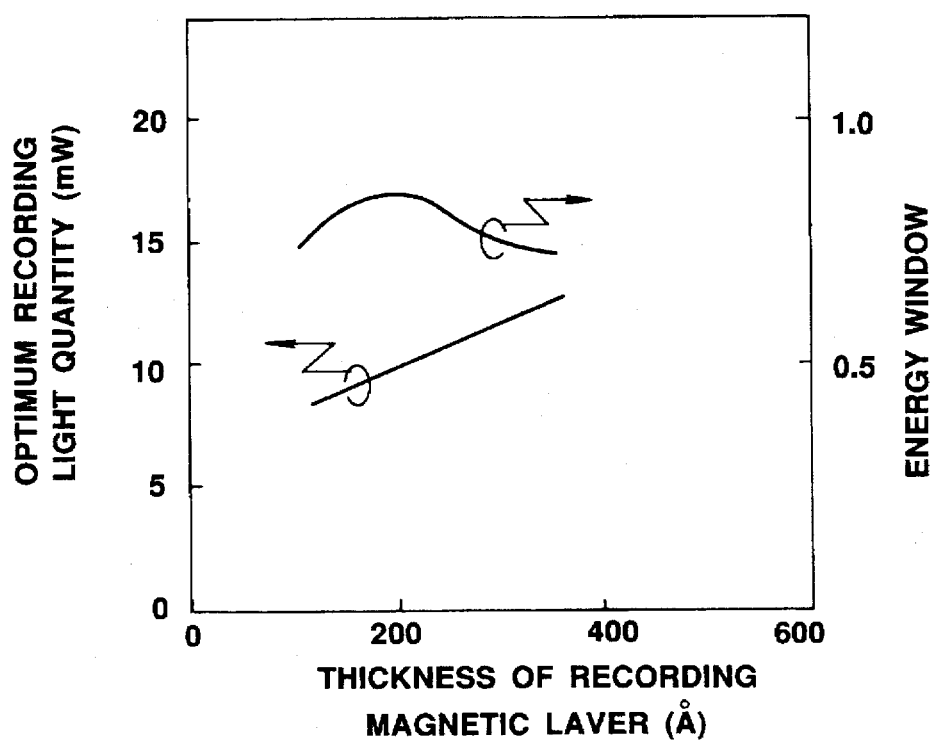
FIG. 4 is a diagram showing the dependency of the film thickness of the recording magnetic layer on the optimum recording light quantity and the energy window.

FIG. 4 shows the above energy window and the optimum light quantity as the results of the analyses. In the present computation, the thickness of the first protective dielectric layer 11 was set to 1000 Å, while that of the second protective dielectric layer 13 was set to 500 Å and that of the reflective metal layer 14 was set to 700 Å. The energy window was found to be the range for which a signal to noise ratio of not less than 45 dB could be obtained. The results are shown in FIG. 4, from which it is seen that the energy window is maximum for the film thickness of the recording magnetic layer 12 of 200 Å, and is reduced for the larger or lesser film thicknesses. The optimum recording light quantity required is the larger, the thicker the recording magnetic layer 12. The value of the energy window is preferably not less than 0.75, so that the upper limit of the film thickness of the recording magnetic layer 12 is 280 Å. If the value of the desirable energy window is assumed to be not less than 0.80, the upper limit of the film thickness of the recording magnetic layer 12 is about equal to 260 Å.

Limitations of the Curie point of the recording magnetic layer 12 for adaptation to the working temperature conditions ranging over a wide extent of 0° to 60° C. will be hereinafter explained.

Figure 5:
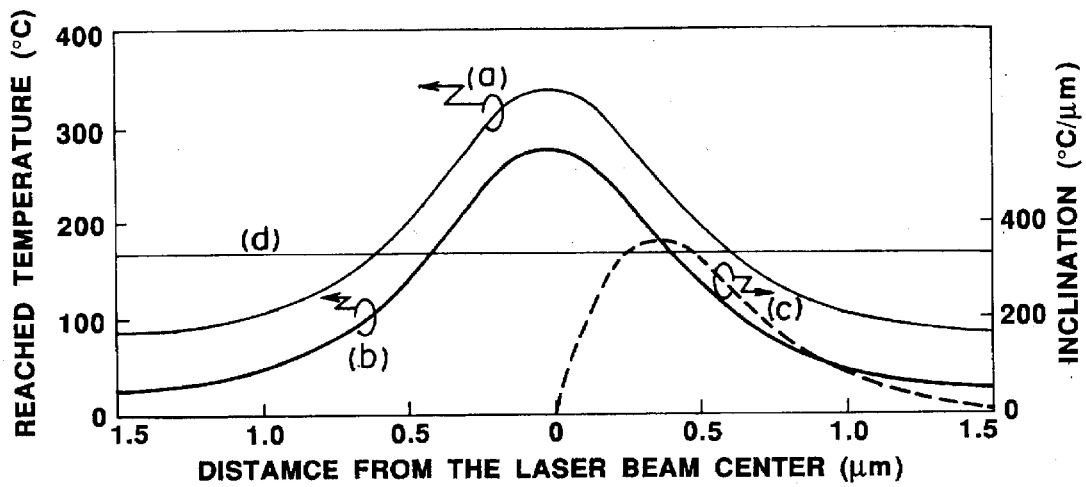
FIG. 5 is a diagram showing the distribution of the temperature reached during irradiation of recording laser pulses, and the inclination of the temperature profile.

FIG. 5 shows the temperature profile in the above described computation, wherein the maximum temperature reached by various portions are viewed in the sectional plane normal to the scanning direction in which as the recording laser pulse of 10 mW and 45 nanoseconds were irradiated while scanning at a position of the radius of 30 mm with a rpm of 3600. In this figure, the curves (a) and (b) stand for the inclination of the temperature profiles under the environment of 60° C. and 0° C. while the curve (c) stands for the inclination of the temperature profile. For elevating the resolution capability, it is necessary that the inclination of the temperature profile be in the larger range at the Curie point which determines the boundary of the magnetic domain in which the direction of magnetization is inverted by recording.

If the Curie point is selected to be within the range in which this inclination has the magnitude of not less than 230° C./μm, the temperature is not less than 170° C., as indicated by the line (d).

If the Curie point is high, the temperature at the time of recording is correspondingly higher. This upper limit is determined at the temperature at which the amorphous recording magnetic layer 12 is crystallized. If this layer 12 is crystallized, perpendicular magnetic anisotropy and hence the function of magnetization are lost. Differential thermal analysis has revealed that the static crystallization temperature of the TbFeCo film is approximately 400° C. If the temperature is raised to a temperature higher than 400° C. in a shorter time interval of 100 nanoseconds during recording, crystallization does not occur immediately. However, when it is required to perform recording and erasure over $10^6$ times, crystallization proceeds gradually, so that the increase of the temperature above the crystallization temperature is not desirable. FIG. 5 shows the temperature profile in which the optimum recording state is reached at the Curie point of 180° C., the maximum temperature at this time being approximately 330° C. If the Curie temperature exceeds 180° C., the maximum temperature under the optimum recording state is increased by a value corresponding to the ratio of the Curie point. Thus, when the Curie point is set within the range in which the maximum temperature does not exceed the crystallization temperature of 400° C., the upper limit temperature is 220° C.

Constraints to the First Protective Dielectric Layer

As described hereinabove, the first protective dielectric layer 11 has the function of prohibiting the ingress of reactive substances such as oxygen, water molecules or corrosion ions from the base plate under high temperature high humidity conditions, and the optical function as the constituent element of the laminated thin film. From the standpoint of protection, this film is preferably thicker as long as the production efficiency is lowered. Once this requirement is met, the thickness of the first protective dielectric layer 11 may be determined from the magneto-optically optimum conditions.

Figure 6:
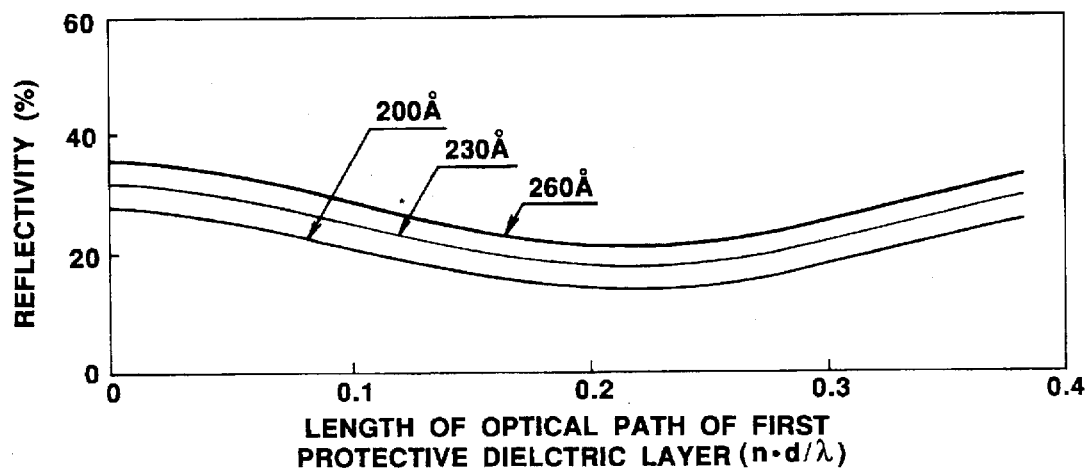
FIG. 6 is a diagram showing the relation between the reflectivity and the length of the optical path of the first protective dielectric layer.
Figure 7:
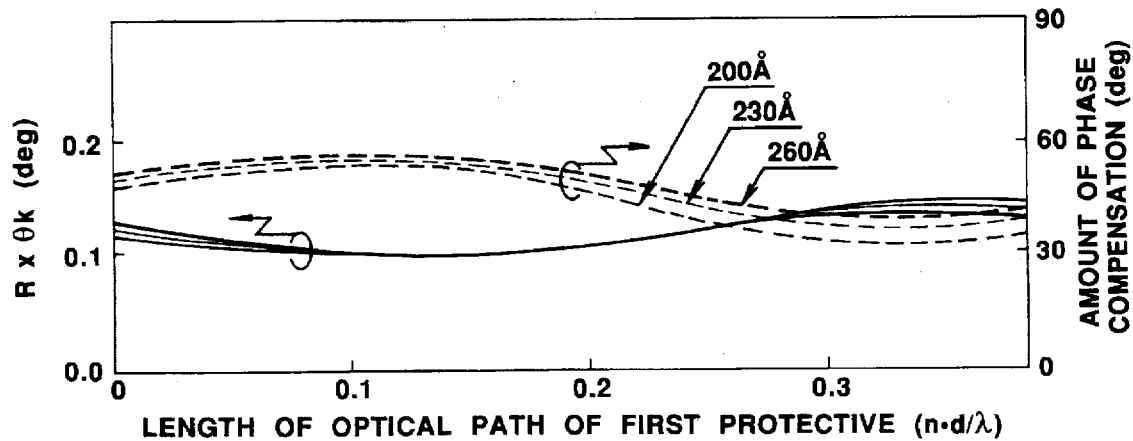
FIG. 7 is a diagram showing the relation among the amount of phase compensation, $R \times \theta_k$ and the length of the optical path of the first protective dielectric layer.

In FIGS. 6 and 7, the values of reflectivity R, the product of the effective Kerr rotation angle $θ_k$ the reflectivity R ($R×θ_k$) and the amount of phase compensation have been computed for various film thicknesses $\underline{d}$ of the first protective dielectric layer, herein of silicon nitride having the refractive index n=2.05 within the range of the above prescribed thickness of the recording magnetic layer 12. The abscissa indicates the length of the optical path through the film thickness of the first protective dielectric layer 11, in terms of the ratio of the product of the refractive index $\underline{n}$ and thickness $\underline{d}$ of the film 11 to the wavelength λ of the laser light employed, or n.d/λ. The reproducing signal is proportional to the product of the effective Kerr rotation angle $θ_k$ and the reflectivity R, which is equivalent to the magnitude of the reproducing signal. The amount of phase compensation means that value of the amount of phase compensation which is necessary to restore the laser light reflected in the form of elliptical polarization into linear polarization. Unless phase compensation is not performed, the value of the amount of phase compensation is perferably as small as possible, since then the reproducing signal is reduced.

As illustrated, the contribution of the thickness of the first protective dielectric layer 11 to the magneto-optical properties is less than that of the thickness of the recording magnetic layer 12 or of the second protective dielectric layer 13 subsequently to be described. However, with the length of the optical path of the film thickness in the range of 0.2 to 0.3 wavelength, the product of the effective Kerr rotation angle and the reflectivity is larger and the value of the amount of phase compensation is less, so that the thickness of the first protective dielectric layer 11 is preferably within this range.

Constraints to the Second Protective Dielectric Layer

Figure 8:
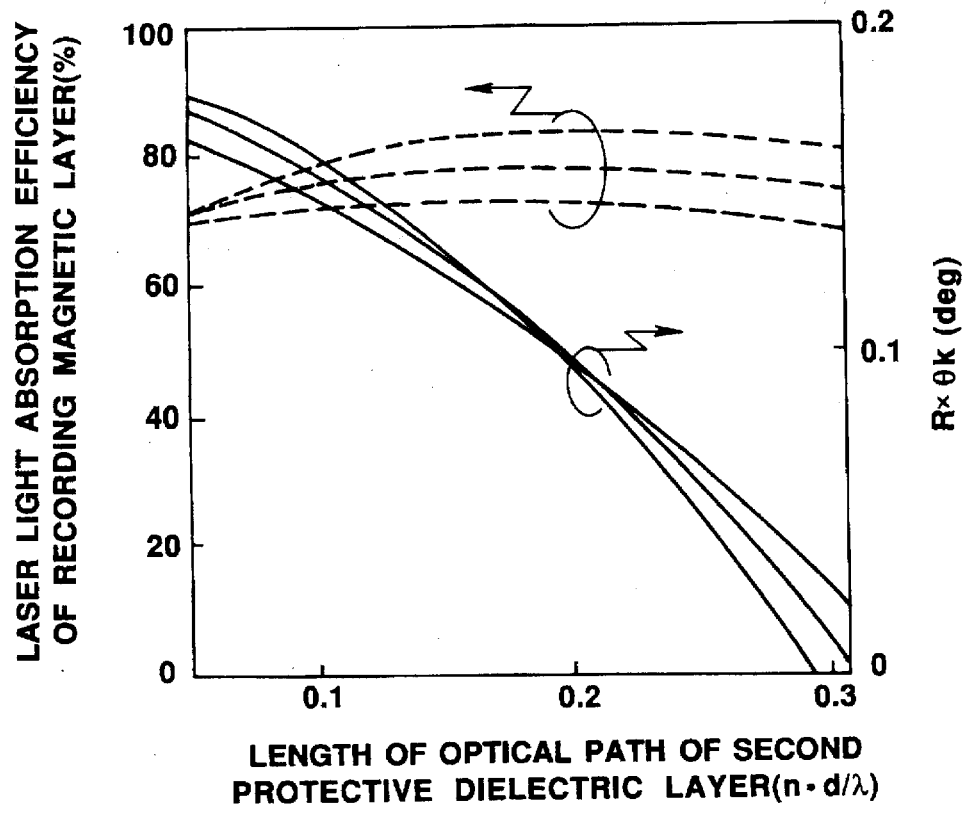
FIG. 8 is a diagram showing the relation among the length of the optical path of the second protective dielectric layer, $R \times \theta_k$ and the laser light absorption efficiency of the recording magnetic layer.
Figure 9:
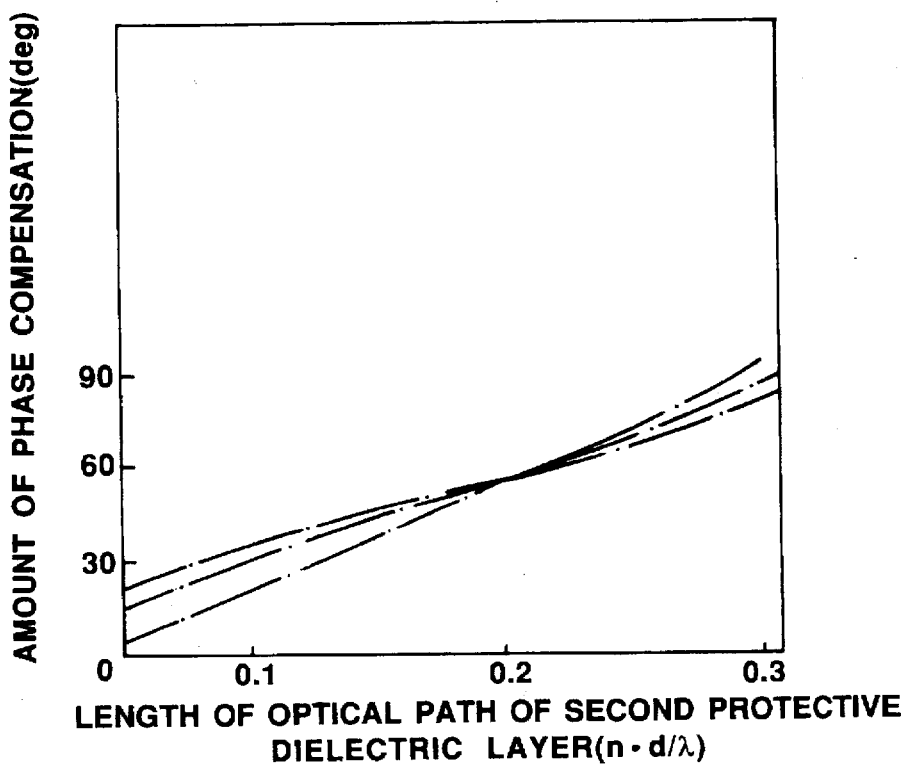
FIG. 9 is a diagram showing the relation between the amount of phase compensation and the length of the optical path of the second protective dielectric layer.

FIGS. 8 and 9 illustrate the results of computation of how the laser light absorption efficiency, the product of the reflectivity R, the effective Kerr rotation angle $θ_k$ ($R×θ_k$), and the amount of phase compensation are changed when the thickness of the second protective dielectric film 13 of silicon nitride with the refractive index n of 2.05 is changed within the range of above described constraints on the film thicknesses of the first protective dielectric film 11 and the recording magnetic layer 12. Similarly to FIGS. 6 and 7, the abscissa indicates the ratio of the product of the film thickness $\underline{d}$ and the refractive index $\underline{n}$ to the wavelength λ of the laser light. As illustrated, the thickness of this second protective dielectric layer 13 affects the magneto-optical properties tremendously. The range of this thickness is critical.

The laser light absorption efficiency of the recording magnetic layer 12 does not depend appreciably on the thickness of the second protective dielectric layer 13. The Kerr signal, which is the product of the effective Kerr rotation angle $θ_k$ equivalent to the magnitude of the reproducing signal and the reflectivity R, becomes the larger, the lesser the thickness of the second protective dielectric layer 13. Since the value of the amount of phase compensation is also lesser for the lesser thickness of the layer 13, more favorable reproducing signal characteristics may be obtained magneto-optically for the lesser thickness range of the second protective dielectric layer 13.

However, the more favorable function of the film 13 as the protective film may be obtained for the thicker thickness of the film 13, and the optical path of the film 13 less than 0.1 wavelength is insufficient. Moreover, the insulating effects between the recording magnetic layer 12 and the heat conductive reflective metal layer 14 become insufficient with the reduced film thickness so that not only the recording sensitivity is lowered but also the resolution capability is also lowered since the heat is spread transversely through the reflective metal layer 14.

Figure 10:
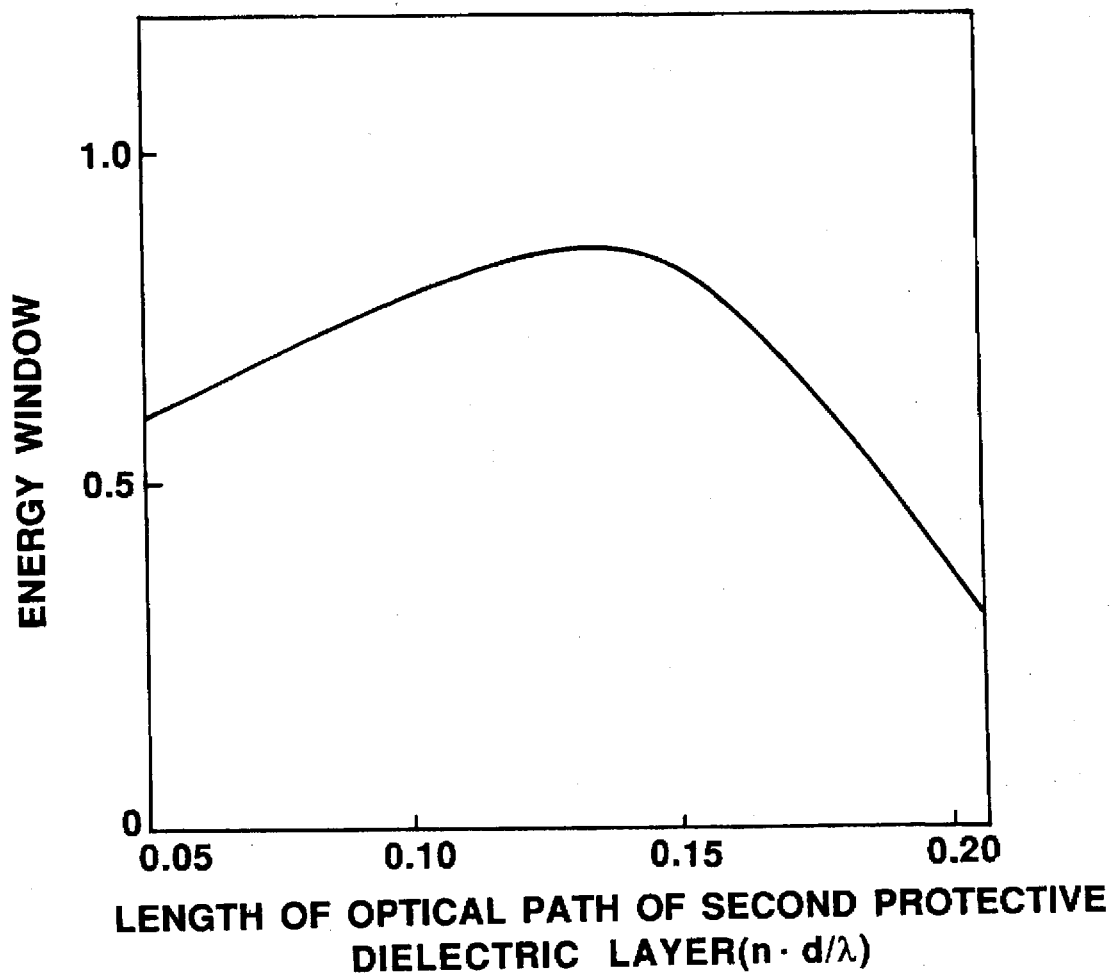
FIG. 10 is a diagram showing the relation between the energy window and the length of the optical path of the second protective dielectric layer.

In FIG. 10, computation has been made of the energy window, as the critical recording characteristics, with the thickness of the second protective dielectric layer 13 being changed, as in FIG. 4. As shown, the energy window becomes maximum for the film thickness of 0.14 in terms of the length of the optical path. The energy window becomes the smaller, the lesser the film thickness, although the magneto-optical properties are improved for the range of the smaller film thicknesses. A value of the energy window of not less than 0.75 is desirable, as in the case of FIG. 4, and the preferred range of the thickness of the second protective dielectric layer 13 is 0.1 to 0.15 wavelength in terms of the length of the optical path. If the value of the desirable energy window is assumed to be not less than 0.80, the lower limit of the length of the optical path is about 0.108.

Constraints to the Reflective Metal Layer

This reflective metal layer 14 is endowed with the optical function as the reflective layer, with the thermal function as the heat sink, and with the function of preventing the corrosion of the recording magnetic layer that may be corroded readily. If the reflective metal layer 14 is present, the absorption efficiency of the recording laser light by the recording magnetic layer 12 is improved in the optical aspect. On the other hand, the scanning linear velocity dependency of the optimum recording sensitivity is reduced in the thermal aspect, whereas the corrosion resistant effect is improved in the chemical aspect. These functions are the more outstanding, the larger the film thickness, and are insufficient for a film thickness of not more than 400 Å. However, the thermal capacity is increased with increase in the film thickness so that the recording sensitivity is lowered. Therefore, for achieving the practical utilities in accordance with the objective of the present invention, a film thickness of the reflective metal layer 14 of not less than 500 Å and not more than 1000 Å is preferred.

In order that the reflective metal layer 14 will be provided with the function of preventing the corrosion of the recording magnetic layer 12, it is necessary that the reflective metal layer 14 be less noble electro-chemically than the recording magnetic layer 12, in order to prevent the situation in which the recording magnetic layer 12 is corroded preferentially when a local cell is formed in the presence of defect such as pin holes or the like. Although aluminum meets this condition, metals such as platinum, gold, silver or copper are not preferred since they promote the corrosion of the recording magnetic layer 12.

Although various minor changes and modifications might be proposed by those skilled in the art, it will be understood that we wish to include within the claims of the patent warranted hereon all such changes and modifications as reasonably come within our contribution to the art.

What is claimed is:

1. A magneto-optical disk, comprising:

beginning at a light incident side of the disk for recording and reproducing, a transparent base plate, a first protective dielectric layer formed of nitride in abutting contact with the base plate, an amorphous recording magnetic layer having perpendicular magnetic anisotropy directly following and in abutting contact with the first protective layer, a second protective dielectric layer formed of a nitride directly following and in abutting contact with the recording layer, and a reflective metal layer directly following and in abutting contact with the second layer and formed of a metal electro-chemically less noble than said recording magnetic layer;

said recording magnetic layer being a magnetic layer mainly comprising TbFeCo and having a film thickness of not less than 180 Å and not more than 280 Å and a Curie point of the magnetic layer being not lower than 170° C. and not higher than 220° C.;

said first protective dielectric layer having a product of a refractive index and a film thickness thereof of not less than 0.2 and not more than 0.35 times a wavelength of laser light being employed, the wavelength being the same for recording and reproducing;

said second protective dielectric layer having a product of a refractive index and a film thickness thereof of not less than 0.1 and not more than 0.15 times the wavelength of the laser light employed; and said reflective metal layer having a film thickness of not less than 500 Å, and not more than 1000 Å and a reflectivity at a boundary with the second protective dielectric layer of not less than 70%.

2. The magneto-optical disk according to claim 1 wherein the recording magnetic layer has a thickness of not less than 180 Å and not more than 260 Å.

3. The magneto-optical disk according to claim 1 wherein the first protective dielectric layer is formed of an element selected from the group consisting of silicon nitride or aluminum nitride.

4. The magneto-optical disk according to claim 1 wherein the second protective dielectric layer is formed of an element selected from the group consisting of silicon nitride or aluminum nitride.

5. The magneto-optical disk according to claim 1 wherein the product of the refractive index and the film thickness of the second protective dielectric layer is not less than 0.108 and not more than 0.15 times the wavelength of the laser light employed.

6. The magneto-optical disk according to claim 1 wherein an organic protective film is formed on the reflective metal layer.

7. The magneto-optical disk according to claim 6 wherein the organic protective film is formed of a light curable resin.

8. A magneto-optical disk, comprising:

beginning at a light incident side of the disk for recording and reproducing, a transparent base plate, a first protective dielectric layer formed of nitride in abutting contact with the base plate, an amorphous magnetic recording layer having perpendicular magnetic anisotropy directly following and in abutting contact with the first protective layer, a second protective dielectric layer formed of a nitride directly following and in abutting contact with the recording layer, and a reflective metal layer directly following and in abutting contact with the second layer and formed of aluminum which is electrochemically less noble than said recording magnetic layer;

said recording magnetic layer being a magnetic layer mainly comprising TbFeCo and having a film thickness of not less than 180 Å and not more than 260 Å, and a Curie point of the magnetic layer being not lower than 170° C. and not higher than 220° C.;

said first protective dielectric layer being formed of an element selected from the group consisting of silicon nitride or aluminum nitride and having a product of a refractive index and a film thickness thereof of not less than 0.2 and not more than 0.35 times a wavelength of laser light employed, the wavelength being the same for recording and reproducing;

said second protective dielectric layer being formed of an element selected from the group consisting of silicon nitride or aluminum nitride and having a product of a refractive index and a film thickness thereof of not less than 0.1 and not more than 0.15 times the wavelength of the laser light employed;

said reflective metal layer having a film thickness of not less than 500 Å and not more than 1000 Å and a reflectivity at a boundary with the second protective dielectric layer of not less than 70%; and an organic protective film being formed on the reflective metal layer.

* * * * *